United States Patent Office 3,135,720
Patented June 2, 1964

3,135,720
NEW POLYMERIZATION PRODUCTS CONTAINING EPOXY GROUPS
Hans Batzer, Arlesheim, and Arthur Maeder, Therwil, Switzerland, assignors to Ciba Limited, Basel, Switzerland, a company of Switzerland
No Drawing. Filed May 29, 1961, Ser. No. 113,147
Claims priority, application Switzerland June 2, 1960
12 Claims. (Cl. 260—89.5)

The present invention provides new polymerization products which are obtained when (a) monoepoxides of the formula (I) 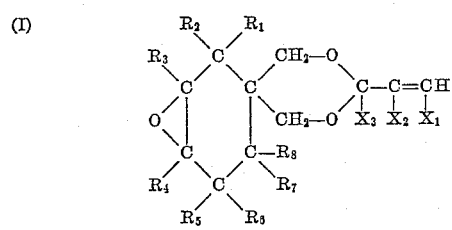

—where $R_1$ to $R_8$ each represents a monovalent substituent such as halogen or hydrogen atom, an alkoxy group, or an aliphatic, cycloaliphatic, araliphatic or aromatic hydrocarbon radical, preferably an alkyl group with 1 to 4 carbon atoms, and $R_1$ and $R_5$ together may also represent an alkylene such as a methylene group; $X_1$ and $X_2$ each represents a hydrogen atom or a methyl group, and $X_3$ a hydrogen atom or an alkyl group with 1 to 4 carbon atoms—are polymerized, if desired together with (b) copolymerizable, ethylenically unsaturated monomeric compounds.

As starting monomers (a) of the Formula I there are particularly readily accessible the monoepoxides of the formula (II) 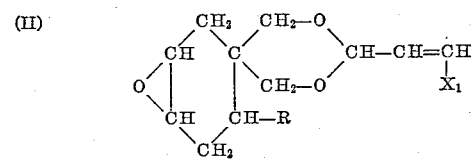

where R represents a hydrogen atom or a lower alkyl group and $X_1$ a hydrogen atom or a methyl group.

The polymerizable monoepoxides (I) are obtained by treating an unsaturated acetal or ketal of the general formula (III) 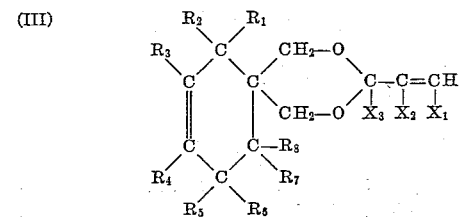

—where $R_1$ to $R_8$, $X_1$ to $X_3$ have the same meanings as in Formula I—with an epoxidizing agent under conditions such that oxygen is added on only to the cycloolefinic double bond.

The acetals and ketals of the Formula III are obtained in their turn by acetalizing an aldehyde or ketone respectively of the formula (IV) 

with a dialcohol of the formula (V) 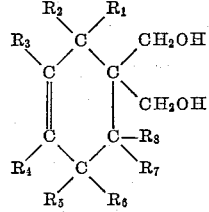

From among aldehydes of the Formula IV there may be mentioned acrolein, methacrolein and crotonaldehyde. As ketones of the Formula IV there may be mentioned methylvinyl ketone and ethylvinyl ketone.

Suitable dialcohols of the Formula V are, for example:

1:1-bis-[hydroxymethyl]-cyclohexene-(3),
1:1-bis-[hydroxymethyl]-6-methyl-cyclohexene-(3),
1:1 - bis - [hydroxymethyl] - 2:4:6 - trimethyl - cyclohexene-(3),
1:1 - bis - [hydroxymethyl] - 2:5 - endomethylene - cyclohexene-(3), and
1:1-bis-[hydroxymethyl]-4-chloro-cyclohexene-(3).

The acetalization and ketalization respectively may follow the usual pattern and consist, for example, in heating an aldehyde or ketone of the Formula IV together with a dialcohol (V) in the presence of an acidic catalyst such, for example, as sulfuric, phosphoric or paratoluenesulfonic acid. For the following treatment of the acetal or ketal of the Formula III with the epoxidizing agent the conditions must be selected so that only the carbon-to-carbon double bond in the cyclohexene ring is epoxidized. It is of advantage to perform the epoxidation with the aid of an organic per-acid such as peracetic, perbenzoic, peradipic, monoperphthalic acid or the like, which attack the carbon-to-carbon double bond in the olefinic side chain only under much more drastic reaction conditions than the cycloolefinic double bond.

As starting monomers (b), which, if desired, may be copolymerized with the monoepoxides (I), there are suitable those which contain a carbon-to-carbon double bond, more especially an $H_2C=C<$ group, such as vinyl esters of organic acids, for example vinyl acetate, vinyl formate, vinyl butyrate or vinyl benzoate; furthermore vinylalkyl ketones, vinyl halides such as vinyl chloride, vinyl fluoride, vinylidene chloride; vinylaryl compounds such as styrene and substituted styrenes; furthermore compounds of the acrylic acid series such as esters of acrylic acid with alcohols or phenols, for example ethyl acrylate, butyl acrylate, dodecyl acrylate, acrylonitrile or acrylamide and its derivatives substituted on the amide nitrogen; furthermore analogous derivatives of methacrylic acid, α-chloracrylic acid, crotonic acid, maleic acid or fumaric acid. Furthermore there may be used polymerizable olefines such as isobutylene, butadiene, 2-chlorobutadiene, or heterocyclic compounds containing at least one vinyl group. A preferred method of preparing copolymers consists in using at most 30% by weight of the monoepoxide (a) calculated on the total weight of the monomers. Among these polymers the binary or ternary copolymers containing in addition to at most 30% by weight of monoepoxide (a) also acrylonitrile and if desired a third monomer, more especially in acrylic acid ester as polymerization components, are distinguished by particularly favorable technical properties, and are especially suitable as pigment binders.

The polymerization may take the form of block, solvent or emulsion polymerization with the use of the measures conventionally applied in polymerization technique: inter alia, it is of advantage to use a polymerization catalyst. There may be added one of the known compounds conventionally used for catalysing polymerizations such as α:α′-azoisobutyrodinitrile and organic peroxides, or persalts, for example peracetic acid, acetyl peroxide, benzoyl peroxide, benzoylacetyl peroxide, lauroyl peroxide, cumenehydroperoxide, tertiary butylhydroperoxide, paramenthanehydroperoxide, hydrogen peroxide, percarbonates, persulfates or perborates. The amount of catalyst to be added depends in known manner on the desired progress of the reaction or on the properties the final polymer is desired to possess. If desired, a combination of several substances capable of catalysing the polymerization may be added. The effect of the polymerization catalysts can be enhanced by simultaneous heating and/or irradiation with actinic rays. It may even be possible to accomplish polymerization simply by heating and/or with the aid of actinic rays, without adding a catalyst. To enable the reaction speed in the polymerization and the molecular weight of the polymers to be modified, so-called regulators such, for example, as mercaptans, terpenes or the like, may be added.

It is of further advantage to carry out the polymerization in the absence of air or oxygen and in the presence of an inert gas such as nitrogen. Furthermore, it is possible to use so-called activators in addition to the aforementioned catalysts and regulators. Such activators are, for example, inorganic, oxidizable sulfur compounds containing oxygen such as sulfur dioxide, sodium bisulfite, ammonium bisulfite, sodium hydrosulfite and sodium thiosulfate. When the aforementioned activators and polymerization catalysts giving off oxygen are simultaneously present, there are formed so-called redox systems which have a favorable influence on the progress of the polymerization. Further suitable activators are water-soluble aliphatic tertiary amines such as triethanolamine or diethylethanolamine. Furthermore, it is possible to accelerate the action of the polymerization catalyst by additional use of a heavy-metal compound which may exist in more than one valency stage and is present in the reduced state, or by adding a complex cyanide of iron, mercury, molybdenum, tin, copper, silver or of a mixture of such complexes.

The polymerization may be carried out at room temperature, though it is more advantageous to polymerize at an elevated temperature. A suitable temperature ranges, for example, from 40 to 95° C., more especially from 55 to 90° C. The polymerization is often accompanied by liberation of a considerable amount of heat and in such cases it is necessary to provide cooling means to enable maintenance of the desired polymerization temperature. This is especially necessary when a large batch is to be polymerized. To utilize the liberated heat and facilitate the regulation of the polymerization temperature, it has been found advantageous, for example in emulsion polymerization and solvent polymerization, to introduce only a portion of the emulsion or solution to be polymerized into the polymerization apparatus and to allow polymerization to set in this portion. When the temperature in this portion of the emulsion or solution has reached a certain level, for example 60° to 70° C., the remainder of the cold emulsion or solution is run in at a rate such that the temperature can be kept constant. Towards the end of the polymerization it is often necessary to supply external heat.

When the polymerization is carried out in emulsion, it is of advantage to emulsify the monomers with the aid of emulsifying agents which may be cationic or non-ionic. From the group of cationic emulsifiers there may be mentioned, for example, compound of higher fatty amines with acetic acid, hydrochloric acid or sulfuric acid, such as octadecylamine acetate, (dodecyl)-diethyl-cyclohexyl-amine sulfate, furthermore salts of diethylaminoethyl esters of higher fatty acids, or salts of the type of oleylamidoethyl-diethylamino acetate $$C_{17}H_{33}CONHC_2H_4NH—(C_2H_5)_2.OCOCH_3$$

Further suitable are quaternary ammonium compounds such as cetyl dimethyl benzylammonium chloride, cetyl trimethyl ammoniumbromide, para-(trimethylammonium)-benzoic acid cetyl ester methosulfate, cetyl pyridinium methosulfate, octadecyl trimethyl ammoniumbromide or the quaternary compound from diethylsulfate and triethanolamine tristearate.

From among non-ionic emulsifiers there may be mentioned ethylene oxide condensation products of higher fatty acids, fatty amines or fatty alcohols such as cetyl, octadecenyl or octadecyl alcohol, for example reaction products of 15 to 30 molecular proportions of ethylene oxide with 1 mol of the fatty alcohol. There may also be used emulsifiers having a pronounced cross-linking action such as octylphenol polyglycol ether, also dodecyl alcohol polyglycol ether or polyalcohols partially esterified with higher fatty acids such, for example, as glycerol monolaurate or sorbitol monolaurate. There may also be used mixtures of such emulsifiers, as well as mixtures of such emulsifiers with protective colloids such as polyvinyl alcohols, partially hydrolysed polyvinyl esters, also starch or starch derivatives, for example dextrin, as well as cellulose ethers and polyethylene oxides and quite generally with water-soluble polymers or copolymers containing free hydroxyl, amino or carboxylic acid amide groups. Finally, such protective colloids may also be used on their own.

When the polymerization is carried out in a solvent, the solvent may be one in which only the monomeric compounds but not the polymers are soluble; there may also be used solvents in which both the monomers and the polymers are soluble. Suitable solvents are, for example, organic solvents such as acetone, benzene or dichloroethane. The polymerization is advantageously performed with heating, preferably at the boiling temperature of the solvent, and with addition of peroxidic catalysts soluble in the reaction medium such, for example, as lauroyl peroxide, or a mixture of lauroyl peroxide and α:α′-azoisobutyrodinitrile.

Depending on the polymerization conditions and starting materials used, the polymers are obtained in the form of viscous solutions, granulates or emulsions. If desired, the product resulting from the polymerization may be used as it is. In many cases it is preferable, however, first to process the product in a suitable manner; it may be admixed, for example, with modifying substances such as a plasticizer, for example dibutyl phthalate or dioctyl phthalate, triphenyl phosphate or a sebacic acid ester, also organic or inorganic pigments or fillers.

As extenders and fillers there may be added, for example, asphalt, bitumen, glass fibers, mica, quartz meal, cellulose, kaolin, finely dispersed silicic acid (Aerosil) or metal powders.

Furthermore, the polymerization of the monomers may be carried out on a substratum such, for example, as a glass fiber fabric or a textile material. In such a case it is of advantage to impregnate the substratum with a solution or emulsion of the monomers and then to perform polymerization by heating the impregnated material in the presence of a polymerization catalyst.

By virtue of the presence of epoxide groups the homopolymers and copolymers of the invention react with the conventional curing agents for epoxy compounds. Accordingly, by adding such curers they may be cross-linked or cured in the same manner as other polyfunctional epoxy compounds or epoxy resins. As such curers there are suitable basic or more especially acidic compounds, for example amines or amides such as aliphatic and aromatic primary, secondary and tertiary amines, for example mono-, di- and tributylamines, para-phenylenediamine, ethylene-diamine, N:N-diethylethylene diamine, diethylenetriamine, triethylenetetramine, tetraethylenepentamine, trimethylamine, diethylamine, triethanolamine, Mannich's bases, piperidine, piperazine, guanidine and guanidine derivatives such as phenyldiguanidine, diphenylguanidine and dicyandiamide; formaldehyde resins with aniline, urea or melamine; polymers of aminostyrenes; polyamides, for example those from aliphatic polyamines and dimerized or trimerized unsaturated fatty acids; isocyanates, isothiocyanates; polyhydric phenols, for example resorcinol, hydroquinone, quinone; phenolaldehyde resins and oil-modified phenol aldehyde resins; reaction products of aluminum alcoholates or phenolates with tautomeric compounds of the type of acetoacetic acid; Friedel-Crafts catalysts, for example aluminum trichloride, antimony pentachloride, tin tetrachloride, ferric chloride, zinc chloride, boron trifluoride and complexes thereof with organic compounds; metal fluoborates such as zinc fluoborate; phosphoric acid; salts of acid reaction such as zinc nitrate, diammonium phosphate or ammonium silicofluoride; polybasic carboxylic acids and anhydrides thereof, for example phthalic anhydride, methylendomethylene-tetrahydrophthalic anhydride, hexahydrophthalic anhydride, dodecenylsuccinic anhydride, hexachloro-endomethylene tetrahydrophthalic anhydride or mixtures thereof; maleic or succinic anhydride, if desired in conjunction with an accelerator such as a tertiary amine. The term "curing" is used here to describe the conversion of the aforementioned substantially linear polymers containing epoxide groups into cross-linked, insoluble or infusible resins.

The homopolymers and copolymers of the present invention may be used for a wide variety of purposes. Quite generally they can be used wherever curable condensation resins and/or polymerization resins are used, either on their own or in combination with curing agents; furthermore in combination with reactive compounds or with other curable condensation resins such, for example, as lower polyfunctional compounds such, for example, as methylolamides of dibasic or polybasic fatty acid amides or fatty acid hydrazides, aminoplasts, phenoplasts, epoxy resins, polyacetals from polyalcohols and aldehydes, and similar products, with or without addition of fillers, as well as in solution or emulsions as textile assistants or textile dressing agents, as binders in pigment dyeing and printing textile materials, more especially those of synthetic fibers, for example polyamide, polyester or polyacrylonitrile fibers; furthermore as lacquers, paints, dippling resins, casting resins, coating compositions, pore fillers, putties, adhesives and similar products, as well as for the manufacture thereof.

The following examples illustrate the invention. Parts and percentages are by weight.

The polymers of the invention were manufactured as described in the examples with the use of Products I, II and III described below.

PRODUCT I (a) *Acetal From Acrolein and 1:1-Bis-[Hydroxymethyl]-Cyclohexene-3*

A mixture of 286 parts of 1:1-bis-[hydroxymethyl]-cyclohexene-3, 118 parts of acrolein and 3 parts of sulfuric acid of 50% strength is heated with stirring on an oil bath to an external temperature of 80° C., and after 30 minutes 350 parts by volume of benzene are added dropwise. The temperature of the oil bath is then raised to 120 to 130° C. and the water liberated during the reaction is distilled off azeotropically with the use of a rotary distillation apparatus (see the article by H. Batzer and co-workers in "Die makromolekulare Chemie," No. 7, pages 84 to 85 [1951]). After 2 hours the benzene is expelled under reduced pressure. The residue (344 parts) is treated with 1.5 parts of sodium acetate and distilled under vacuum. The acetal [3-vinyl-2:4-dioxospiro(5:5)-undecene-9] passes over at 94 to 99° C. under a pressure of 6 mm. Hg.

Yield: 226 parts (=62.5% of the theoretical). $n_D^{20}=1.4908$.

(b) *Epoxidation*

A solution of 900 parts of the acetal prepared as described above under (a) in 2250 parts of benzene is treated with 100 parts of sodium acetate, and 1045 parts of peracetic acid of 40% strength are cautiously stirred in dropwise at 25 to 30° C. After about 4 hours 100% of the stoichiometric amount of peracetic acid has undergone reaction. The reaction mixture is then agitated in a separating funnel with 3×200 parts by volume of water and 4×300 parts by volume of saturated sodium carbonate solution until alkaline reaction has been established, dried over sodium sulfate and the benzene is distilled off under reduced pressure.

The epoxidized acetal [3-vinyl-2:4-dioxospiro(5:5)-9:10-epoxy-undecane] of the formula

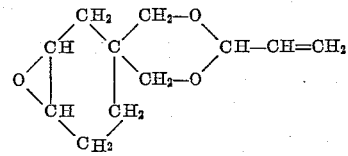

passes over at 90 to 98° C. under 0.5 to 0.6 mm. Hg pressure.

Yield: 739 parts (=75.5% of the theoretical).
Epoxide content: 5.14 (theoretical:5.1) epoxide groups per kg.
Determination of double bonds: 6.0 (theoretical: 5.1) double bonds per kg.

PRODUCT II

*Epoxidized Acetal From Acrolein and 1:1-Bis-[Hydroxy-Methyl]-6-Methylcyclohexene-3*

A solution of 968 parts of bis-[1:1-hydroxymethyl]-6-methyl-cyclohexene-3 in 2000 parts of benzene is mixed with 6.5 parts each of zinc chloride and phosphoric acid. The mixture is heated to 50° C., treated with 364 parts of acrolein and maintained for ½ hour at 50° C., then heated rapidly to an external temperature of about 120° C., and the water of reaction is distilled off azeotropically through a rotary distillation apparatus; in the course of 2 hours about 120 parts of water are isolated in this manner. When the benzene passes over as a clear liquid, the whole is cooled to 50° C., treated with 100 parts of sodium acetate, and 1340 parts of peracetic acid of 42.5% strength are then added dropwise so rapidly that the temperature can be maintained at 50° C., by cooling with ice. After about 1 hour the mixture is cooled to 20° C. and the remaining peracetic acid is back-titrated, about 100% of the theoretical amount having undergone reaction.

The reaction mixture is then shaken in a separating funnel with 3×750 parts of water and then with a saturated sodium carbonate solution to establish alkaline reaction. Each aqueous layer is further extracted in a second separating funnel with 1000 parts of benzene. The benzene solutions are combined, once more washed with 250 parts of water, dried over sodium sulfate and filtered. The benzene is expelled on a water bath under 10 mm. Hg pressure, and the residue is dried until its weight remains constant.

There are obtained 1195 parts (=92.5% of the theoretical yield) of a bright-yellow liquid crude product containing 4.31 epoxide equivalents per kg. (=90.5% of the theoretical content). Fractionated distillation at 83 to 90° C. under 0.2 mm. Hg pressure yields 815.5 parts (=63% of the theoretical yield) of a water-clear product containing 4.72 epoxide equivalents per kg. (=99% of the theoretical content) which has a refractive index $n_{20}^D$ of 1.4958. This product consists substantially of the pure epoxidized acetal [3-vinyl-7-methyl-2:4-dioxospiro(5:5)-9:10-epoxy-undecane] of the formula

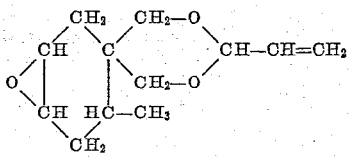

PRODUCT III (a) *Acetal From Crotonaldehyde and 1:1-Bis-[Hydroxy-Methyl]-Cyclohexene-3*

A mixture of 286 parts of bis-[hydroxymethyl]-cyclohexene-3, 140 parts of crotonaldehyde, 3 parts of sulfuric acid of 50% strength and 350 parts by volume of benzene is condensed as described for Product I(a).

The acetal [3-propenyl-2:4-dioxospiro(5:5)-undecane-9] passes over at 82 to 89° C. under 5 mm. Hg pressure.

Yield: 252 parts (=65% of the theoretical).
Refractive index $n_{20}^D = 1.4939$.

(b) *Epoxidation*

652 parts of the acetal prepared as described above under (a) are dissolved in 1680 parts by volume of benzene, mixed with 70 parts of sodium acetate and then epoxidized at 25 to 30° C. with 704 parts of peracetic acid of 40% strength as described above for Product I(b). The epoxidized acetal [3-propenyl-2,4-dioxospiro(5:5)-9:10-epoxy-undecane] of the formula

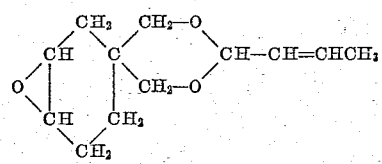

passes over at 114 to 118° C. under a pressure of 0.6 to 0.8 mm. Hg.

Yield: 381 parts (=54% of the theoretical).
Epoxide content: 4.65 (theoretical: 4.75) epoxide groups per kg.
Determination of double bonds: 4.3 (theoretical: 4.75) double bonds per kg.

EXAMPLE 1

*Copolymer From Ethyl Acrylate, Acrylonitrile and Product I (Acetal From 1:1-Bis[Hydroxymethyl]-3:4-Epoxycyclohexane and Acrolein) (20:50:30)*

A solution of 30 parts of Product I, 14.3 parts of acrylonitrile and 5.7 parts of ethyl acrylate in 200 parts of dichloroethane is heated to 55° C. in a stirring flask equipped with reflux condenser and tube for introducing nitrogen. The air is expelled from the apparatus and a solution of 30% strength of 1.7 parts of acetylperoxide in dimethyl phthalate is added. When the temperature has risen to 57° C., a mixture of 35.7 parts of acrylonitrile, 14.3 parts of ethyl acrylate and 0.8 part of the 30% solution of acetyl peroxide in dimethyl phthalate is run in within 15 minutes. When the addition is complete, the mixture is polymerized for 24 hours. In the course of the polymerization the copolymer separates out as a granular substance so that it can be isolated by filtration.

The hard, tough polymer is readily soluble in hot dimethylformamide, but in most conventional solvents it is insoluble.

After having been purified by reprecipitation with isopropanol the copolymer contains 1.53 epoxide equivalents per kg. which proves that the unsaturated epoxy compound has been completely copolymerized.

Films cast from a solution of the copolymer are completely transparent and have a shiny surface. Moreover, they adhere excellently to the glass pane on which they have been produced. The polymer can be worked up mechanically.

When a solution of the resin in dimethylformamide is treated with 0.75% of boron trifluoride etherate complex, complete gelatinization of the copolymer sets in immediately, more especially after slight heating, owing to cross-linking.

CURING

When the solution of the polymer is treated with (1) 1.1% of phosphoric acid, calculated on the weight of the resin, and the mixture is cured for 5 minutes at 130° C., there is obtained an opaque film which can be pulled off and is insoluble in hot trichloroethylene but swells in hot dimethylformamide;

(2) 0.75% of boron trifluoride etherate complex, calculated on the weight of the resin, and cured for 5 minutes at 130° C., there is obtained a clear film which can be pulled off, is insoluble in hot trichloroethylene but swells in hot dimethylformamide;

(3) 1% of phthalic anhydride, calculated on the weight of the resin, and cured for 5 minutes at 130° C., there is obtained a very handsome, clear film which can be pulled off, is insoluble in hot trichloroethylene but swells in hot dimethylformamide.

EXAMPLE 2

*Copolymer From Butylacrylate, Acrylonitrile and Product I (20:50:30)*

A solution of 30 parts of Product I, 14.3 parts of acrylonitrile and 5.7 parts of butyl acrylate in 200 parts of dichloroethane is heated to 55° C., in a stirring flask equipped with reflux condenser, thermometer and tube for introducing nitrogen. The air is displaced from the apparatus and 1.7 parts of a 30% solution of acetyl peroxide in dimethyl phthalate are added. In the course of 15 minutes a mixture of 35.7 parts of acrylonitrile, 14.3 parts of butylacrylate, and 0.8 part of a 30% solution of acetyl peroxide in dimethyl phthalate is then run in. On completion of the addition the mixture is polymerized for 24 hours. During the polymerization the polymer separates out in granular form so that it can be filtered off.

The hard polymer can be dissolved in hot dimethylformamide, but in most conventional solvents it is insoluble. The copolymer is purified by being dissolved in dimethylformamide and precipitated with isopropanol. The determination of the epoxide content reveals 1.53 epoxide equivalents per kg., that is to say that the unsaturated epoxy compound has undergone complete copolymerization. Films cast from a solution of the copolymer are transparent, clear, colorless, hard but not brittle, and can be pulled off the glass pane.

EXAMPLE 3

*Copolymer From Butylacrylate, Styrene and Product I (20:50:30)*

A solution of 30 parts of Product I, 14.3 parts of styrene and 5.7 parts of butylacrylate in 200 parts of dichloroethane is heated to 70° C., in a stirring flask equipped with reflux condenser, thermometer and tube for introducing nitrogen. After having displaced the air from the apparatus, 1.7 parts of a 30% solution of acetyl peroxide in dimethyl phthalate are added. In the course of 15 minutes a mixture of 35.7 parts of styrene, 14.3 parts of butyl acrylate and 0.8 part of a 30% solution of acetyl peroxide in dimethylphthalate is then run in.

On completion of the addition the mixture is polymerized within 41 hours with addition of 2×4 parts of a 30% solution of acetyl peroxide in dimethyl phthalate. The catalyst is divided into 8 portions, one portion being added at intervals of one hour each.

The copolymer gives a clear solution in dichloroethane and in most conventional solvents and can be purified by precipitation from petroleum ether. It contains 1.49 epoxide equivalents per kg., corresponding to a copolymerization of the unsaturated epoxy compound of 97.4% of the theoretical. Films cast from a solution of the copolymer are transparent, clear, colorless, hard and brittle.

EXAMPLE 4

*Copolymer From Ethyl Acrylate, Acrylonitrile and Product I (65:5:30)*

A solution of 30 parts of Product I, 18.57 parts of ethyl acrylate and 1.43 parts of acrylonitrile in 200 parts of dichloroethane is heated to 70° C. in a stirring flask equipped with reflux condenser, thermometer and tube for introducing nitrogen. After having displaced the air from the apparatus, 1.7 parts of a 30% solution of acetyl peroxide in dimethyl phthalate are added. In the course of 15 minutes a mixture of 46.43 parts of ethyl acrylate, 3.57 parts of acrylonitrile and 0.8 part of a 30% solution of acetyl peroxide in dimethyl phthalate is then run in, with the temperature inside the flask rising by 6° C.

In the course of the polymerizataion, 11 parts of a 30% solution of acetyl peroxide in dimethyl phthalate are added within 58 hours and after a pause of 7 hours, 4 parts of a 60% solution of butyl hydroperoxide in toluene are added within 14 hours. The total time taken by the polymerization is 81 hours.

The copolymer gives a clear solution in dichloroethane and in the conventional solvents and can be purified by precipitation from petroleum ether.

It contains 1.13 epoxide equivalents per kg., corresponding to a copolymerizataion of the unsaturated epoxy compound of 73.8% of the theoretical. Films cast from a solution of the copolymer are transparent, clear, colorless and slightly tacky.

EXAMPLE 5

*Copolymer From Butyl Acrylate, Acrylonitrile and Product I (65:5:30)*

A solution of 30 parts of Product I, 18.57 parts of butyl acrylate and 1.43 parts of acrylonitrile in 200 parts of dichloroethane is heated to 70° C. in a stirring flask equipped with reflux condenser, thermometer and tube for introducing nitrogen. After having displaced the air from the apparatus, 1.7 parts of a 30% solution of acetyl peroxide in dimethyl phthalate are added. In the course of 15 minutes a mixture of 46.43 parts of butyl acrylate, 3.57 parts of acrylonitrile and 0.8 part of a 30% solution of acetyl peroxide in dimethyl phthalate is run in.

During the polymerization there are added within 58 hours 11 parts of a 30% solution of acetyl peroxide in dimethyl phthalate and, after a pause of 7 hours, 4 parts of a 60% solution of butyl hydroperoxide in toluene are added within 14 hours. The total time taken by the polymerization is 81 hours.

The copolymer gives a clear solution in dichloroethane and in the conventional solvents and can be purified by precipitation from petroleum ether.

It contains 1.11 epoxide equivalents per kg., corresponding to a copolymerization of the unsaturated epoxy compound of 72.5% of the theoretical.

Films cast from a solution of the copolymer are transparent, clear, colorless and slightly tacky.

EXAMPLE 6

*Copolymer From Ethyl Acrylate, Acrylonitrile and Product I (30:40:30)*

A solution of 30 parts of Product I, 8.75 parts of ethyl acrylate, and 11.43 parts of acrylonitrile in 200 parts of dichloroethane is heated to 60 C. in a stirring flask equipped with reflux condenser, thermometer and tube for introducing nitrogen. After having displaced the air from the apparatus, 1.7 parts of acetyl peroxide in dimethyl phthalate are added. In the course of 15 minutes a mixture of 21.25 parts of ethyl acrylate, 28.57 parts of acrylonitrile and 0.8 part of a 30% solution of acetyl peroxide in dimethyl phthalate is run in, with the temperature in side the flask rising by 4° C.

On completion of the addition the mixture is polymerized for 68 hours and in the course of the polymerization 1.6 parts of a 60% solution of butyl hydroperoxide in toluene are added.

The polymer gives a clear solution in dichloroethane and in the conventional solvents and can be purified by precipitation from petroleum ether. It contains 1.32 epoxide equivalents per kg., corresponding to a copolymerization of the unsaturated epoxy compound of 86.4% of the theoretical.

Films cast from a solution of the copolymer are transparent, clear, colorless and brittle.

EXAMPLE 7

*Copolymer From Ethyl Acrylate, Acrylonitrile and Product I (35:35:30)*

A solution of 30 parts of Product I, 10 parts of ethyl acrylate, and 10 parts of acrylonitrile in 200 parts of dichloroethane is heated to 60° C. in a stirring flask equipped with reflux condenser, thermometer and tube for introducing nitrogen. After having displaced the air from the apparatus, 1.7 parts of a solution of acetyl peroxide in dimethyl phthalate are added. Within 15 minutes a mixture of 25 parts of ethyl acrylate, 25 parts of acrylonitrile and 0.8 part of a solution of acetyl peroxide in dimethyl phthalate is then run in. On completion of the addition the mixture is polymerized for 58 hours and during the polymerization 6.4 parts of a 60% solution of butyl hydroperoxide in toluene are added, with the temperature being raised within the last 20 hours to 70° C.

The copolymer gives a clear solution in dichloroethane and in the conventional solvents and can be purified by precipitation from petroleum ether.

It contains 1.21 epoxide equivalents per kg., corresponding to a copolymerization of the unsaturated epoxy compound of 79.1% of the theoretical.

Films cast from a solution of the copolymer are transparent, clear, colorless and brittle.

EXAMPLE 8

*Copolymer From Butyl Acrylate, Acrylonitrile and Product I (50:20:30)*

A solution of 30 parts of Product I, 14.3 parts of butyl acrylate and 5.7 parts of acrylonitrile in 200 parts of dichloroethane is heated to 60° C. in a stirring flask equipped with reflux condenser, thermometer and tube for introducing nitrogen. After having displaced the air from the apparatus, 1.7 parts of a 30% solution of acetyl peroxide in dimethyl phthalate are added. In the course of 15 minutes a mixture of 35.7 parts of butyl acrylate, 14.3 parts of acrylonitrile and 0.8 part of a 30% solution of acetyl peroxide in dimethyl phthalate is then run in.

On completion of the addition the mixture is polymerized for 56 hours, and in the course of the polymerization 4 parts of a 60% solution of butyl hydroperoxide in toluene are added, with the temperature being raised to 70° C. within the last 20 hours.

The copolymer gives a clear solution in dichloroethane and in the usual solvents and can be purified by precipitation from petroleum ether.

It contains 1.12 epoxide equivalents per kg., corresponding to a copolymerization of the unsaturated epoxy compound of 73.2% of the theoretical.

Films cast from a solution of the copolymer are transparent, clear, colorless, soft and non-tacky, and cannot be pulled off the glass pane on which they have been produced.

EXAMPLE 9

*Copolymer From Butyl Acrylate and Product I (70:30)*

A solution of 30 parts of Product I and 20 parts of butyl acrylate in 200 parts of dichloroethane is heated to 80° C. in a stirring flask equipped with reflux condenser, thermometer and tube for introducing nitrogen.

After having displaced the air from the apparatus, 1.5 parts of 40% methylethyl ketone peroxide in toluene are added, whereupon in the course of 15 minutes a mixture of 50 parts of butyl acrylate and 1 part of a 40% solution of methylethyl ketone peroxide in toluene is run in, during which time the temperature in the reaction flask rises by 10° C.

On completion of the addition the mixture is polymerized for 64 hours and during the polymerization a mixture of 1 part each of benzoyl peroxide and lauroyl peroxide is added.

The copolymer gives a clear solution in dichloroethane and in the usual solvents and can be purified by precipitation from petroleum ether.

It contains 1.14 epoxide equivalents per kg., corresponding to a copolymerization of the unsaturated epoxy compound of 74.5% of the theoretical.

Films cast from a solution of the copolymer are transparent, clear, colorless and tacky.

EXAMPLE 10

*Copolymer From Ethyl Acrylate and Product I (80:20)*

A solution of 20 parts of Product I and 25 parts of ethyl acrylate in 200 parts of dichloroethane is heated to 70° C. in a stirring flask equipped with reflux condenser, thermometer and tube for introducing nitrogen.

After having displaced the air from the apparatus, 1.7 parts of a 30% solution of acetyl peroxide in dimethyl phthalate are added, whereupon in the course of 15 minutes a mixture of 55 parts of ethyl acrylate and 0.8 part of a 30% solution of acetyl peroxide is run in, with the internal temperature rising by 20° C.

On completion of the addition the mixture is polymerized for 41 hours, and in the course of the polymerization 8 parts of 30% acetyl peroxide in dimethyl phthalate are added.

The copolymer gives a clear solution in dichloroethane and in the usual solvents and can be purified by precipitation from petroleum ether.

It contains 0.76 epoxide equivalent per kg., corresponding to a copolymerization of the unsaturated epoxy compound of 49.7% of the theoretical.

Films cast from a solution of the copolymer are clear, colorless, soft and non-tacky.

EXAMPLE 11

*Copolymer From Ethyl Acrylate, Acrylonitrile and Product I (40:40:20)*

A solution of 20 parts of Product I, 12.5 parts of ethyl acrylate and 12.5 parts of acrylonitrile in 280 parts of dichloroethane is heated to 70° C. in a stirring flask equipped with reflux condenser, thermometer and tube for introducing nitrogen. After having displaced the air from the apparatus, 1.7 parts of a 30% solution of acetyl peroxide in dimethyl phthalate are added, whereupon within 15 minutes a mixture of 27.5 parts of ethyl acrylate, 27.5 parts of acrylonitrile and 0.8 part of a 30% solution of acetyl peroxide in dimethyl phthalate is run in.

On completion of the addition the mixture is polymerized for 41 hours, and in the course of the polymerization 8 parts of 30% acetyl peroxide in dimethyl phthalate are added.

The copolymer is clear, yellowish and soluble in dichloroethane and in the usual solvents and can be purified by precipitation from petroleum ether or isopropanol.

It contains 0.87 epoxide equivalent per kg., corresponding to a copolymerization of the unsaturated epoxy compound of 85.3% of the theoretical.

Films cast from a solution of the copolymer are clear, slightly yellowish, brittle and non-tacky.

EXAMPLE 12

*Copolymer From Butyl Acrylate, Acrylonitrile and Product I (25:45:30)*

A solution of 30 parts of Product 1, 7.14 parts of butyl acrylate and 12.86 parts of acrylonitrile in 200 parts of dichloroethane is heated to 70° C. in a stirring flask equipped with reflux condenser, thermometer and tube for introducing nitrogen. After having displaced the air from the apparatus, 1.5 parts of a 40% solution of methylethyl ketone peroxide in toluene are added, whereupon within 15 minutes a mixture of 17.86 parts of butyl acrylate, 32.14 parts of acrylonitrile and 1 part of a 40% solution of methylethyl ketone peroxide in toluene is run in.

On completion of the addition the mixture is polymerized from 38 hours, and in the course of the polymerization 2.5 parts of a 30% solution of acetyl peroxide in dimethyl phthalate are added.

The copolymer settles out partially and can then be dissolved only in hot dimethylformamide. It can be purified by precipitation from isopropanol.

It contains 0.96 epoxide equivalents per kg., corresponding to a copolymerization of the unsaturated epoxy compound of 62.7% of the theoretical.

Films cast from a solution of the copolymer are clear, dry, colorless and can be pulled off the glass pane on which they have been produced.

EXAMPLE 13

*Copolymer From Ethyl Acrylate, acrylonitrile and Product I in Emulsion (20:50:30)*

A preliminary emulsion is prepared by vigorously shaking a mixture of 20 parts of ethyl acrylate, 50 parts of acrylonitrile, 30 parts of Product I, 2 parts of sodium lauroyl sulfate, 137 parts of distilled water and 0.05 part of triethanolamine. One half of this emulsion is then charged into a stirring flask equipped with reflux condenser and thermometer and previously scavenged with nitrogen, and the batch is heated to 60° C. When a solution of 0.04 part of sodium bisulfite in 4 parts of water and of 0.04 part of potassium persulfate in 4 parts of water are added, the temperature rises slightly, whereupon the remaining half of the mixture of monomers is dropped in within 30 minutes.

10 minutes after completion of the dropwise addition 0.02 part of potassium persulfate in 2 parts of water are added, and a short time later the temperature of the bath is raised to 70° C.

The addition of catalyst is repeated 3 times more at intervals of 1 hour each, and the bath temperature is raised to 80° C. After another 8 hours the reaction mixture is cooled to room temperature. A thinly liquid, finely dispersed emulsion containing 36.7% of polymer is obtained.

The emulsion is mixed with methanol, and the precipitated copolymer is dissolved in dimethylformamide and precipitated in isopropanol.

It contains 1.3 epoxide equivalents per kg., corresponding to a copolymerization of the unsaturated epoxy compound of 100% of the theoretical.

Films cast from a solution of the copolymer are clear, colorless and can be pulled off the glass pane on which they have been produced.

Films cast from the emulsion are hard and brittle.

EXAMPLE 14

*Copolymer From Ethyl Acrylate, Acrylonitrile and Product I in Emulsion (65:5:30)*

A mixture of 65 parts of ethyl acrylate, 5 parts of acrylonitrile, 30 parts of Product I, 2 parts of sodium lauroyl sulfate, 137 parts of distilled water and 0.05 part of triethanolamine is emulsified in a homogenizing machine. One half of the emulsion is introduced into a stirring flask equipped with reflux condenser and thermometer which has previously been scavenged with nitrogen, and heated to 60° C. A solution of 0.04 part of sodium bisulfite in 4 parts of water and of 0.04 part of potassium persulfate in 4 parts of water are added, whereupon the temperature rises slightly, and the remaining half of the emulsion of monomers is then added dropwise within 30 minutes.

10 minutes after completion of the dropwise addition 0.02 part of potassium persulfate in 2 parts of water is added and a short time later the bath temperature is raised to 70° C.

The identical amount of catalyst is added 3 times more at intervals of 1 hour each, with the bath temperature being raised to 80° C. After another 17 hours the mixture is cooled to room temperature. A thinly liquid, finely dispersed emulsion containing 32.8% of polymer is obtained.

The emulsion is mixed with methanol, the precipitated copolymer is dissolved in acetone and precipitated with petroleum ether. It contains 0.60 epoxide equivalent per kg., corresponding to a copolymerization of the unsaturated epoxy compound of 39.2%.

Films cast from a solution of the copolymer are clear, soft, non-tacky and adhere tenaciously to the glass pane on which they have been produced, whereas films cast from the emulsion are clear, soft, very little tacky and cannot be pulled off the glass pane.

EXAMPLE 15

*Copolymer From Ethyl Acrylate, Vinyl Acetate and Product I (20:50:30)*

As described in Example 1 a solution is prepared from 30 parts of Product I, 5.7 parts of ethyl acrylate and 14.3 parts of vinyl acetate in 200 parts of dichloroethane. The apparatus is scavenged with nitrogen and the batch heated to 60° C., whereupon 1.7 parts of a 30% solution of acetyl peroxide in dimethyl phthalate are added. In the course of 15 minutes a mixture of 14.3 parts of ethyl acrylate, 35.7 parts of vinyl acetate and 0.8 part of a 30% solution of acetyl peroxide in dimethyl phthalate is run in. After 24 hours, in the course of 16 hours, a catalyst mixture of 1 part of benzoyl peroxide and 1 part of lauroyl peroxide is then added, and the mixture is polymerized for 72 hours. The copolymer is clear, colorless and soluble in dichloroethane as well as in all usual solvents. It can be purified by precipitation from petroleum ether.

It contains 1.33 epoxide equivalents per kg., corresponding to a copolymerization of the unsaturated epoxy compound of 87.0% of the theoretical. Films cast from a solution of the copolymer are colorless, clear and brittle.

EXAMPLE 16

*Homopolymer of Product I*

20 parts of Product I are polymerized with 2 parts of a 30% solution of acetyl peroxide in dimethyl phthalate and 0.2 part of azoisobutyrodinitrile in a stirring flask scavenged with nitrogen. The polymerization takes 24 hours. The polymer obtained as described is purified by precipitation from petroleum ether. The yield of resin amounts to 32.0%.

Films cast from a solution of the resin are clear, colorless, soft and non-tacky.

EXAMPLE 17

*Copolymer From Ethyl Acrylate, Acrylonitrile and Product II (Acetal From 1:1-Bis-[Hydroxymethyl]-6-Methyl - 3:4 - Epoxy - Cyclohexane and Acrolein) (20:50:30)*

As described in Example 1 a solution of 30 parts of Product II, 5.7 parts of ethyl acrylate and 14.3 parts of acrylonitrile in 200 parts of dichloroethane is prepared. The apparatus is scaveneged with nitrogen, the batch heated to 70° C., and 1.7 parts of a 30% solution of acetyl peroxide in dimethyl phthalate are added. In the course of 15 minutes a mixture of 14.3 parts of ethyl acrylate, 35.7 parts of acrylonitrile and 0.8 part of a 30% solution of acetyl peroxide in dimethyl phthalate is then run in.

The mixture is polymerized for 24 hours and the copolymer precipitates in granular form. It is of yellow color and can be dissolved only in hot dimethylformamide. It can be purified by precipitation from isopropanol. It contains 1.4 epoxide equivalents per kg., corresponding to complete copolymerization of the unsaturated epoxy compound.

Films cast from a solution of the copolymer are clear, colorless and brittle.

EXAMPLE 18

*Copolymer From Ethyl Acrylate, Acrylonitrile and Product II in Emulsion (20:50:30)*

A preliminary emulsion is prepared by thoroughly agitating a mixture of 20 parts of ethyl acrylate, 50 parts of acrylonitrile, 30 parts of Product II, 2 parts of sodium lauroyl sulfate, 137 parts of distilled water and 0.05 part of triethanolamine. One half of this emulsion is then introduced into a stirring flask equipped with reflux condenser and thermometer which has previously been scavenged with nitrogen, and the batch is heated to 60° C. On addition of a solution of 0.04 part of sodium bisulfite in 4 parts of water and of 0.04 part of potassium persulfate in 4 parts of water the temperature rises slightly, whereupon the other half of the mixture of monomers is added dropwise within 30 minutes. 10 minutes after completion of the dropwise addition 0.02 part of potassium persulfate in 2 parts of water is added and a short time later the bath temperature is raised to 70° C. The addition of catalyst is repeated three more times at intervals of one hour each, with the bath temperature being raised to 80° C. After another 19 hours the mixture is cooled to room temperature.

A thinly liquid, finely dispersed emulsion is obtained which contains 38.6% of polymer. The emulsion is treated with methanol, and the precipitated copolymer is dissolved in dimethylformamide and precipitated from isopropanol. It contains 1.42 epoxide equivalents per kg., corresponding to complete copolymerization of the unsaturated epoxy compounds.

Films cast from a solution of the copolymer are clear, dry and can be pulled off the glass pane on which they have been produced.

EXAMPLE 19

*Copolymer From Ethyl Acrylate, Acrylonitrile and Product III (Acetal From 1:1-Bis-[Hydroxymethyl]-3:4-Epoxycyclohexane and Crotonaldehyde (20:50:30)*

A solution of 30 parts of Product III, 5.7 parts of ethyl acrylate and 14.3 parts of acrylonitrile in 200 parts of dichloroethane is prepared as described in Example 1.

The apparatus is scavenged with nitrogen, the batch heated to 70° C., and 1.7 parts of a 30% solution of acetyl peroxide in dimethyl phthalate are added. In the course of 15 minutes a mixture of 14.3 parts of ethyl acrylate, 35.7 parts of acrylonitrile and 0.8 part of a 30% solution of acetyl peroxide in dimethyl phthalate is then run in. After 1½ hours the polymer formed precipitates and the temperature rises by 8° C.

The mixture is polymerized for 24 hours. The copolymer is yellow, pulverulent and soluble only in hot dimethylformamide; it can be purified by precipitation with isopropanol. It contains 1.4 epoxide equivalents per kg., corresponding to complete copolymerization of the unsaturated epoxy compound.

Films prepared from a solution of the copolymer are transparent, clear, colorless and can be pulled off the glass pane on which they have been produced.

EXAMPLE 20

*Copolymer From Ethyl Acrylate, Acrylonitrile and Product III in Emulsion (20:50:30)*

A preliminary emulsion is prepared by thoroughly agitating a mixture of 20 parts of ethyl acrylate, 50 parts of acrylonitrile, 30 parts of Product III, 2 parts of sodium lauroyl sulfate, 137 parts of distilled water and 0.5 part of triethanolamine. One half of this emulsion is then introduced into a stirring flask which is equipped with reflux condenser and thermometer and has previously been scavenged with nitrogen, and the batch is heated to 60° C.

On addition of a solution of 0.04 part of sodium bisulfite in 4 parts of water and a solution of 0.04 part of potassium persulfate in 4 parts of water, the temperature rises slightly, whereupon the other half of the mixture of monomers is added dropwise within 30 minutes. 10 minutes after completion of the dropwise addition, 0.02 part of potassium persulfate in 2 parts of water is added and a short time later the bath temperature is raised to 70° C. The addition of catalyst is repeated three times more at intervals of one hour each, with the bath temperature being raised to 80° C. After another 10 hours the mixture is cooled to room temperature.

A thinly liquid, finely dispersed emulsion is obtained which contains 36.1% of polymer. The emulsion is mixed with methanol, the precipitated copolymer dissolved in dimethylformamide and precipitated from isopropanol. It contains 0.54 epoxide equivalents per kg., corresponding to a copolymerization of the unsaturated epoxy compound of 38.0% of the theoretical.

Films cast from a solution of the copolymer are clear, dry and can be pulled off the glass pane on which they have been produced.

EXAMPLE 21

*Copolymer of Vinyl Acetate and Product I (70:30)*

A solution of 20 parts of vinyl acetate and 30 parts of Product I in 200 parts of dichloroethane is heated to 60° C. as described in Example 1 in a stirring flask scavenged with nitrogen. 1.7 parts of a 30% solution of acetyl peroxide in dimethyl phthalate are then added and in the course of 15 minutes a mixture of 50 parts of vinyl acetate and 0.8 part of a 30% solution of acetyl peroxide is run in.

The mixture is polymerized for 36 hours. The resulting copolymer is clear, colorless and soluble in dichloroethane as well as in all usual solvents. It contains 1.51 epoxide equivalents per kg., corresponding to a copolymerization of the unsaturated epoxy compound of 98.6% of the theoretical.

Films cast from a solution of the copolymer are clear, hard, dry and brittle.

EXAMPLE 22

*Copolymer From Butyl Acrylate, Acrylonitrile and Product I in Emulsion (60:10:30)*

A mixture of 60 parts of butyl acrylate, 10 parts of acrylonitrile, 30 parts of Product I, 2 parts of sodium lauroyl sulfate, 137 parts of distilled water and 0.05 part of triethanolamine is emulsified in a homogenizing machine. Copolymerization is carried out for 24 hours as described in Example 14. A highly dispersed, thinly liquid emulsion is obtained which contains 36.6% of polymer (Emulsion A). The polymer contains 1.052 epoxide equivalents per kg., corresponding to a copolymerization of 68.8% of the theoretical. Films cast from a solution of the copolymer are clear, dry and elastic.

EXAMPLE 23

*Copolymer From 2-Ethylhexyl Acrylate, Acrylonitrile and Product I (50:20:30)*

A mixture of 50 parts of 2-ethylhexyl acrylate, 20 parts of acrylonitrile, 30 parts of Product I, 2 parts of sodium lauroyl sulfate, 137 parts of distilled water and 0.05 part of triethanolamine is emulsified in a homogenizing machine. Copolymerization is performed within 24 hours as described in Example 14.

A highly dispersed, thinly liquid emulsion containing 34.8% of polymer is obtained (Emulsion B).

The polymer contains 1.0 epoxide equivalent per kg., corresponding to a copolymerization of 65.4% of the theoretical. Films cast from a solution of the copolymer are clear, dry and elastic.

EXAMPLE 24

An aqueous dyebath is prepared containing in 1000 parts 40 parts of the Emulsion A described in Example 22 or 40 parts of the Emulsion B described in Example 23, 5 parts of ammonium silicofluoride as curer and 7 parts of an aqueous dyestuff paste of the following composition: 24% of the azo pigment of the formula

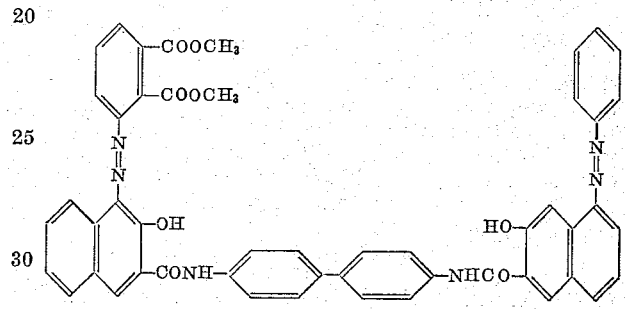

8% of the adduct of 80 molecular proportions of ethylene oxide with 1 molecular proportion of oleyl alcohol, 15% of a solution of 75% of butylated methylolmelamine in butanol, 3% of a mixture of equal parts of casein and urea, and 50% of water.

Mercerized, bleached cotton poplin is impregnated on the padder at room temperature with this dye liquor, squeezed to a weight increase of about 70%, dried at 70 to 90° C. and then cured for 6 minutes at 150° C., and finally calendered cold between paper cylinders.

The perfectly even dyeings produced in this manner display very good resistance to abrasion and good fastness to washing. When the dyebath is prepared with 7 parts of diammonium phosphate instead of with 7 parts of ammonium silicofluoride, the resulting dyeings are slightly less even but still extremely resistant to abrasion and of good fastness to washing.

EXAMPLE 25

A nylon fabric is impregnated at room temperature on the padder with the dye liquor described in Example 24, squeezed to a weight increase of about 40%, dried, cured for 6 minutes at 150° C. and then cold-calendered. The resulting dyeings possess excellent fastness to scrubbing and good fastness to washing.

EXAMPLE 26

A solution of 106 parts of acrylonitrile and 196 parts of Product I in 305 parts of acetone is treated with 4.5 parts of azodiisobutyronitrile and 2.1 parts of lauroyl peroxide. The whole is slowly heated to the boiling point of acetone while refluxing and stirring. After 15 hours the polymerization is brought to an end by cooling and the solution is precipitated in methanol. There are obtained 145 parts of polymer in the form of a whitish yellow powder which is soluble in dimethylformamide.

*Analysis.*—C, 66.75%; H, 7.0%; N, 14.4%; O, 11.85%.

EXAMPLE 27

A solution of 208 parts of monomeric styrene and 196 parts of Product I in 406 parts of acetone is treated with 6 parts of azodiisobutyronitrile and 2.8 parts of lauroyl peroxide. The mixture is then heated to the boiling temperature of acetone. After 18 hours 2.8 parts of benzoyl peroxide are added and the mixture is stirred on for 6 hours. After cooling, the solution is precipitated in cooled methanol and the white precipitate is filtered off and dried, to yield 190 parts of a soft polymer containing 1.16 epoxide equivalents per kg., corresponding to about 47% of the theoretical content. By processing the precipitation bath, 91% of unreacted starting Product I can be recovered.

EXAMPLE 28

*Copolymer From n-Butyl Acrylate, Vinylidene Chloride, Acrylonitrile and Product I in Emulsion (40:20:10:30)*

A preliminary emulsion is prepared by thoroughly agitating a mixture of 40 parts of n-butyl acrylate, 20 parts of vinylidene chloride, 10 parts of acrylonitrile, 30 parts of Product I, 3 parts of sodium α-hydroxyoctadecanesulfonate, 0.2 part of isooctanol, 9 parts of triethanolamine and 150 parts of distilled water. One half of this emulsion is then introduced into a stirring flask equipped with reflux condenser and thermometer which has previously been scavenged with nitrogen and then closed gas tight, and the mixture is heated to 60° C. On addition of 0.06 part of potassium persulfate in 1.2 parts of distilled water a rise in temperature occurs, whereupon the other half of the mixture of monomers is added dropwise within 30 minutes. During the dropwise addition another 0.06 part of potassium persulfate in 1.2 parts of distilled water is added. 10 minutes after completion of the dropwise addition an identical amount of catalyst is added and this addition is repeated after another 30 minutes. One hour after the dropwise addition the bath temperature is raised to 70° C. and the addition of catalyst is repeated 6 more times at intervals of one hour each. After another 8 hours the reaction mixture is cooled to room temperature.

A thinly liquid, finely dispersed emulsion is obtained which contains 33.3% of polymer.

After having been precipitated and dried, tthe resin contains 0.833 epoxide equivalent per kg. corresponding to a copolymerization of the unsaturated epoxy compound of 54.5% of the theoretical.

Films cast from the emulsion of the copolymer are clear, colorless and soft.

EXAMPLE 29

*Copolymer From n-Butyl Acrylate, Vinylidene Chloride Acrylic Acid and Product I in Emulsion (40:25:5:30)*

A preliminary emulsion is prepared by thoroughly agitating a mixture of 40 parts of n-butylacrylate, 25 parts of vinylidene chloride, 5 parts of acrylic acid, 30 parts of Product I, 3 parts of sodium α-hydroxyoctadecanesulfonate, 0.2 part of isooctanol, 11 parts of triethanolamine and 150 parts of distilled water. One half of this emulsion is introduced into a stirring flask which is equipped with reflux condenser and thermometer and has previously been scavenged with nitrogen and then closed gas-tight, and the batch is heated to 60° C. On addition of 0.06 part of potassium persulfate in 1.2 parts of distilled water the temperature rises, whereupon the other half of the mixture of monomers is added dropwise within 30 minutes. During the dropwise addition another addition is made of 0.06 part of potassium persulfate in 1.2 parts of distilled water. 15 minutes after completion of the dropwise addition another identical addition of catalyst is made and repeated after another 30 minutes. One hour after the dropwise addition the bath temperature is raised to 70° C. and 6 more additions of catalyst are made at intervals of one hour each. After a further 8 hours the reaction mixture is cooled to room temperature.

The resulting thinly liquid emulsion contains 35.6% of polymer.

After having been precipitated and dried, the resin contains 0.850 epoxide equivalents per kg., corresponding to a copolymerization of the unsaturated epoxy compound of 55.6% of the theoretical.

Films cast from the emulsion of the copolymer are clear, colorless and slightly tacky.

EXAMPLE 30

*Copolymer From n-Butylacrylate, Acrylic Acid and Product I (50:20:30)*

A solution of 50 parts of n-butyl acrylate, 20 parts of acrylic acid and 30 parts of Product I in 150 parts of isopropanol is heated to 60° C. in a stirring flask which is equipped with reflux condenser and thermometer and has previously been scavenged with nitrogen. 0.1 part of azoisobutyrodinitrile and 0.1 part of lauroyl peroxide are then added and this addition is repeated four times at intervals of one hour each. After a further 24 hours the mixture is cooled. A medium viscous, clear polymer solution is obtained.

After having been precipitated and dried, the resin contains 1.09 epoxide equivalents per kg., corresponding to a copolymerization of the unsaturated epoxy compound of 71.4% of the theoretical. For conversion of the resin into the water-soluble form, the solvent is first removed at about 45° C. in a vacuum evaporator. A mixture is then prepared in a stirring flask from 100 parts of resin (corresponding to 20 parts of acrylic acid), 41.6 parts of concentrated ammonium hydroxide and 150 parts of distilled water. The resulting solution is clear, colorless and contains 34.4% of polymer.

Films, cast from this solution, are clear, hard, brittle and insoluble in water.

EXAMPLE 31

*Copolymer From 2-Ethylhexyl Acrylate, Acrylic Acid, Methylolacrylamide and Product I (40:20:10:30)*

A solution of 40 parts of 2-ethylhexyl acrylate, 20 parts of acrylic acid, 10 parts of methylolacrylamide and 30 parts of Product I in 150 parts of isopropanol is heated to 60° C. in a stirring flask equipped with reflux condenser and thermometer and scavenged with nitrogen. 0.1 part of azoisobutyrodinitrile and 0.1 part of lauroyl peroxide are then added and this addition is repeated four more times at intervals of one hour each. After another 24 hours the mixture is cooled. A medium viscous, clear, slightly yellowish polymer solution is obtained. The precipitated and dried resin contains 0.865 epoxide equivalent per kg., corresponding to a copolymerization of the unsaturated epoxy compound of 56.6% of the theoretical.

To convert the resin into the water-soluble form, the solvent is first removed at about 45° C. in a vacuum evaporator. A mixture is then prepared in a stirring flask from 100 parts of resin (corresponding to 20 parts of acrylic acid), 41.6 parts of concentrated ammonium hydroxide and 150 parts of distilled water. The resulting solution is clear, colorless and contains 34.4% of polymer. Films cast from this solution are clear, hard and insoluble in water.

EXAMPLE 32

*Copolymer From 2-Ethylhexyl Acrylate, Acrylic Acid, Acrylamide and Product I (40:10:20:30)*

A solution of 40 parts of 2-ethylhexyl acrylate, 10 parts of acrylic acid, 20 parts of acrylamide and 30 parts of Product I in 150 parts of isopropanol is heated to 60° C. in a stirring flask which is equipped with reflux condenser and thermometer and has previously been scavenged with nitrogen. 0.1 part of azoisobutyrodinitrile and 0.1 part of lauroyl peroxide are then added and this addition is repeated four more times at intervals of one hour each. After another 20 hours the mixture is cooled. A medium viscous, clear polymer solution is obtained. The precipitated and dried resin contains 1.28 epoxide equivalents per kg., corresponding to a copolymerization of the unsaturated epoxy compound of 83.5% of the theoretical.

To convert the resin into the water-soluble form, the solvent is first removed at about 45° C. in a vacuum evaporator. A mixture is then prepared in a stirring flask from 100 parts of resin (corresponding to 10 parts of acrylic acid), 30.8% of concentrated ammonia and 150 parts of distilled water. The resulting solution is clear, colorless and contains 37.0% of polymer.

Films cast from this solution are clear, hard and insoluble in water.

What is claimed is:

1. A polymerization product which contains polymerized a monoepoxide of the formula

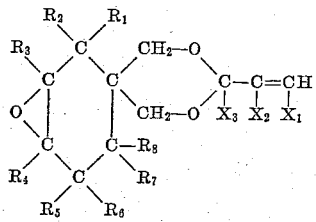

in which $R_1$ and $R_5$ are selected from the group consisting of hydrogen, halogen, lower alkyl of 1 to 4 carbon atoms and together $R_1$ and $R_5$ form the methylene group, $R_2$, $R_3$, $R_4$, $R_6$, $R_7$ and $R_8$ each represents a member selected from the class consisting of hydrogen atom, halogen atom and lower alkyl radical containing 1 to 4 carbon atoms, $X_1$ and $X_2$ each represents a member selected from the class consisting of hydrogen atom and the methyl group, and $X_3$ is a member selected from the class consisting of hydrogen atom and lower alkyl group with 1 to 4 carbon atoms.

2. A polymerization product which contains copolymerized
   (1) a monoepoxide of the formula

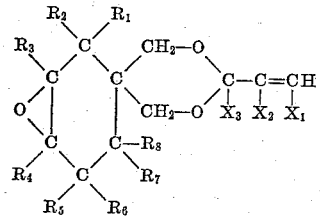

in which $R_1$ and $R_5$ are selected from the group consisting of hydrogen, halogen, lower alkyl of 1 to 4 carbon atoms and together $R_1$ and $R_5$ form the methylene group, $R_2$, $R_3$, $R_4$, $R_6$, $R_7$ and $R_8$ each represents a member selected from the class consisting of hydrogen atom, halogen atom and lower alkyl radical containing 1 to 4 carbon atoms, $X_1$ and $X_2$ each represents a member selected from the class consisting of hydrogen atom and the methyl group, and $X_3$ is a member selected from the class consisting of hydrogen atom and lower alkyl group with 1 to 4 carbon atoms,
   (2) at least one other polymerizable ethylenically unsaturated compound.

3. A polymerization product as claimed in claim 2, wherein the monomer (1) has the formula

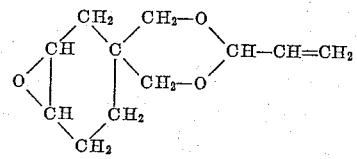

4. A polymerization product as claimed in claim 2, wherein the monomer (1) has the formula

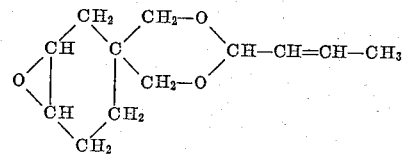

5. A polymerization product as claimed in claim 2, wherein the monomer (1) has the formula

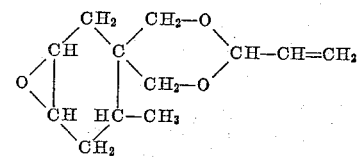

6. A polymerization product as claimed in claim 2, wherein the monomer (1) has the formula

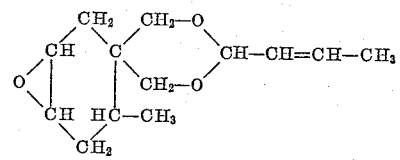

7. A polymerization product as claimed in claim 2, wherein the polymerizable compound (2) is an ester of acrylic acid.

8. A polymerization product as claimed in claim 2, wherein the polymerizable compound (2) is acrylonitrile.

9. A polymerization product as claimed in claim 2, wherein the polymerizable compound (2) is styrene.

10. A polymerization product as claimed in claim 2, wherein the polymerizable compound (2) is vinyl acetate.

11. A polymerization product as claimed in claim 2, which contains copolymerized at most 30% by weight of a monoepoxide (1) calculated on the total weight of the monomers.

12. A polymerization product as claimed in claim 11, which contains copolymerized at most 30% by weight of a monoepoxide (1) calculated on the total weight of the monomers and the remainder consisting essentially of acrylonitrile and an acrylic acid ester.

References Cited in the file of this patent
UNITED STATES PATENTS
2,999,866    Starcher et al. _____ Sept. 12, 1961